(12) United States Patent
Connelly (10) Patent No.: US 9,667,430 B2
(45) Date of Patent: May 30, 2017

(54) SYSTEM AND METHOD FOR A SIP SERVER WITH OFFLINE CHARGING

(75) Inventor: David Connelly, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 709 days.

(21) Appl. No.: 11/956,036

(22) Filed: Dec. 13, 2007

(65) Prior Publication Data

US 2008/0147524 A1 Jun. 19, 2008

Related U.S. Application Data

(60) Provisional application No. 60/869,877, filed on Dec. 13, 2006.

(51) Int. Cl.
| | |
|---|---|
| *H04L 12/14* | (2006.01) |
| *G06Q 20/10* | (2012.01) |
| *G06Q 30/04* | (2012.01) |
| *G06Q 40/00* | (2012.01) |

(52) U.S. Cl.
CPC ............ *H04L 12/14* (2013.01); *G06Q 20/10* (2013.01); *G06Q 30/04* (2013.01); *G06Q 40/12* (2013.12); *H04L 12/1428* (2013.01)

(58) Field of Classification Search
CPC ............................ G06Q 20/40; G06Q 20/401
USPC ........................................................ 705/44
See application file for complete search history.

(56) References Cited

U.S. PATENT DOCUMENTS

| | | | |
|---|---|---|---|
| 5,440,727 A | 8/1995 | Bhide et al. |
| 5,659,596 A | 8/1997 | Dunn |
| 5,963,974 A | 10/1999 | Arimilli et al. |
| 6,052,724 A | 4/2000 | Willie et al. |
| 6,067,301 A | 5/2000 | Aatresh |
| 6,134,673 A | 10/2000 | Chrabaszcz |
| 6,208,870 B1 | 3/2001 | Lorello et al. |
| 6,226,686 B1 | 5/2001 | Rothschild et al. |
| 6,292,833 B1 | 9/2001 | Liao et al. |
| 6,304,949 B1 | 10/2001 | Houlsdworth |

(Continued)

OTHER PUBLICATIONS

BEA Systems, Inc., BEA WebLogic SIP Server: Configuring and Managing WebLogic SIP Server, Dec. 2, 2005, BEA Systems, Inc., Version 2.1, pp. 4-13.

(Continued)

*Primary Examiner* — Kito R Robinson
*Assistant Examiner* — Michael Cranford
(74) *Attorney, Agent, or Firm* — Tucker Ellis LLP (57) ABSTRACT

The SIP server can be comprised of an engine tier that is designed for high throughput processing of SIP communications and a state tier that maintains state information for access by the engine tier. A Java-based offline charging application can be deployed on the SIP server engine tier in order to allow the SIP server to generate offline charging events and transmit them to a charging data function (CDF) server. The state data for the offline accounting session can be maintained on the state tier. Furthermore, timers set to accounting interim interval value can be used to indicate expiration times for the accounting session. The SIP server can use the timers to send periodic interim requests in order to update and maintain the accounting session open.

20 Claims, 7 Drawing Sheets

(56) References Cited

U.S. PATENT DOCUMENTS

| | | | |
|---|---|---|---|
| 6,335,927 B1* | 1/2002 | Elliott | H04L 12/14 370/352 |
| 6,480,862 B1 | 11/2002 | Gall | |
| 6,578,076 B1 | 6/2003 | Putzolu | |
| 6,611,867 B1 | 8/2003 | Bowman-Amuah | |
| 6,621,793 B2 | 9/2003 | Widegren et al. | |
| 6,625,751 B1 | 9/2003 | Starovic et al. | |
| 6,629,260 B1 | 9/2003 | Dancer et al. | |
| 6,708,206 B1 | 3/2004 | Thrane et al. | |
| 6,823,477 B1 | 11/2004 | Cheng et al. | |
| 6,862,689 B2 | 3/2005 | Bergsten et al. | |
| 6,988,133 B1 | 1/2006 | Zavalkovsky et al. | |
| 7,039,037 B2 | 5/2006 | Wang et al. | |
| 7,050,424 B2 | 5/2006 | Cheng et al. | |
| 7,058,046 B2 | 6/2006 | Celi et al. | |
| 7,076,562 B2 | 7/2006 | Singhal et al. | |
| 7,082,102 B1 | 7/2006 | Wright | |
| 7,142,876 B2 | 11/2006 | Trossen et al. | |
| 7,283,539 B2 | 10/2007 | Wang et al. | |
| 7,301,905 B1 | 11/2007 | Tontiruttananon et al. | |
| 7,392,421 B1 | 6/2008 | Bloomstein et al. | |
| 7,464,178 B2 | 12/2008 | Corrigan et al. | |
| 7,506,194 B2 | 3/2009 | Appanna et al. | |
| 2001/0030970 A1 | 10/2001 | Wiryaman et al. | |
| 2002/0036983 A1 | 3/2002 | Widegren et al. | |
| 2002/0039352 A1 | 4/2002 | El-Fekih et al. | |
| 2002/0073404 A1 | 6/2002 | Sokolov et al. | |
| 2002/0077134 A1 | 6/2002 | Mizell et al. | |
| 2002/0129174 A1 | 9/2002 | LaBaw | |
| 2002/0144119 A1 | 10/2002 | Benantar | |
| 2002/0159387 A1 | 10/2002 | Allison et al. | |
| 2003/0028529 A1* | 2/2003 | Cheung | G06Q 30/02 |
| 2003/0033524 A1 | 2/2003 | Tran et al. | |
| 2003/0055920 A1 | 3/2003 | Kakadia et al. | |
| 2003/0093695 A1 | 5/2003 | Dutta | |
| 2003/0095540 A1 | 5/2003 | Mulligan et al. | |
| 2003/0125021 A1 | 7/2003 | Tell et al. | |
| 2003/0158908 A1 | 8/2003 | Jacobs et al. | |
| 2004/0002881 A1 | 1/2004 | Hu et al. | |
| 2004/0116117 A1 | 6/2004 | Ahvonen et al. | |
| 2004/0148357 A1 | 7/2004 | Corrigan et al. | |
| 2004/0168162 A1 | 8/2004 | Park et al. | |
| 2004/0196858 A1 | 10/2004 | Tsai et al. | |
| 2004/0223602 A1 | 11/2004 | Honkasalo et al. | |
| 2004/0260967 A1 | 12/2004 | Guha et al. | |
| 2004/0267882 A1 | 12/2004 | Whynot et al. | |
| 2005/0005022 A1 | 1/2005 | Taylor | |
| 2005/0022047 A1 | 1/2005 | Chandrasekaran | |
| 2005/0152336 A1 | 7/2005 | Bratt et al. | |
| 2005/0185661 A1 | 8/2005 | Scott et al. | |
| 2005/0203962 A1 | 9/2005 | Zhou et al. | |
| 2005/0203994 A1 | 9/2005 | Palmer et al. | |
| 2005/0207432 A1 | 9/2005 | Velez-Rivera et al. | |
| 2005/0237999 A1 | 10/2005 | Shores et al. | |
| 2005/0259806 A1 | 11/2005 | Chang | |
| 2006/0002333 A1 | 1/2006 | Skog et al. | |
| 2006/0010224 A1 | 1/2006 | Sekar et al. | |
| 2006/0069776 A1 | 3/2006 | Shim et al. | |
| 2006/0109818 A1 | 5/2006 | Ramanna et al. | |
| 2006/0128409 A1 | 6/2006 | Gress et al. | |
| 2006/0225108 A1 | 10/2006 | Tabassi et al. | |
| 2007/0005766 A1 | 1/2007 | Singhal et al. | |
| 2007/0011617 A1 | 1/2007 | Akagawa et al. | |
| 2007/0083675 A1* | 4/2007 | Vemulapelli | G06Q 10/107 709/246 |
| 2007/0091874 A1* | 4/2007 | Rockel | G06Q 30/04 370/352 |
| 2008/0021939 A1 | 1/2008 | Dahlstedt et al. | |
| 2008/0046963 A1 | 2/2008 | Grayson et al. | |
| 2008/0126832 A1 | 5/2008 | Morosan et al. | |

OTHER PUBLICATIONS

BEA Systems, Inc. BEA WebLogic SIP Server: Configuring and Managing WebLogic SIP Server. Dec. 2, 2005. BEA Systems, Inc., Version 2.1., p. 4-13.

International Search Report and Written Opinion for PCT/US06/11165, dated Oct. 22, 2007 (7 pages).

Kristensen, A., "SIP Servlet API Version 1.0," Internet article [online], Feb. 4, 2003, http://jcp.org/en/jsr/detail?id=116> [retrieved on Mar. 6, 2009], p. 1—section 1, p. 4—section 1.4.2.

O'Doherty, P. et al., "SIP and the Java Platforms," Internet article [online], Jun. 2003, Sun Microsystems homepage, http://java.sun.com/products/jain/SIP-and-Java.html> [retrieved on Mar. 6, 2009], sections 1, 2.2, 4, 6.

Zhuang et al., Policy Based QoS Architecture in the IP Multimedia Subsystem of UMTS, IEEE Network, May/Jun. 2003, pp. 51-57.

\* cited by examiner

SYSTEM AND METHOD FOR A SIP SERVER WITH OFFLINE CHARGING

CLAIM OF PRIORITY

The present application claims the benefit of U.S. Provisional Patent Application No. 60/869,877 entitled SYSTEM AND METHOD FOR A SIP SERVER WITH OFFLINE CHARGING, by David Connelly, filed on Dec. 13, 2006, which is incorporated herein by reference in its entirety.

CROSS REFERENCE TO RELATED APPLICATIONS

The following commonly owned, co-pending United States patents and patent applications, including the present application, are related to each other. Each of the other patents/applications are incorporated by reference herein in their entirety:

U.S. Patent Application No. 60/869,875, entitled SYSTEM AND METHOD FOR A SIP SERVER WITH ONLINE CHARGING, by David Connelly, filed on Dec. 13, 2006;

U.S. patent application Ser. No. 11/956,066 entitled SYSTEM AND METHOD FOR A SIP SERVER WITH ONLINE CHARGING, by David Connelly, filed on Dec. 13, 2007;

U.S. patent application Ser. No. 11/545,648, entitled SIP SERVER ARCHITECTURE FAULT TOLERANCE AND FAILOVER, by Anno R. Langen, et al., filed on Oct. 10, 2006.

U.S. patent application Ser. No. 11/545,671, entitled SIP SERVER ARCHITECTURE FOR IMPROVING LATENCY IN MESSAGE PROCESSING, by Anno R. Langen, et al., filed on Oct. 10, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to managing telecommunications and more particularly to charging periodic payment services in a telecommunications network environment.

BACKGROUND

Conventionally, telecommunications and network infrastructure providers have relied on often decades old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be too complex and too rigid to allow the creation and deployment of new service offerings. Furthermore, accounting has become an important issue as service providers usually provide prepaid as well as periodically charged services.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device or appliance. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided systems and methods for a SIP server with offline charging. In various embodiments, the SIP server can be comprised of an engine tier that is designed for high throughput processing of SIP communications and a state tier that maintains state information for access by the engine tier. A Java-based offline charging application can be deployed on the SIP server engine tier in order to allow the SIP server to generate offline charging events and transmit them to a charging data function (CDF) server. The state data for the offline accounting session can be maintained on the state tier. Furthermore, timers set to accounting interim interval value can be used to indicate expiration times for the accounting session. The SIP server can use the timers to send periodic interim requests in order to update and maintain the accounting session open.

Figure 1:
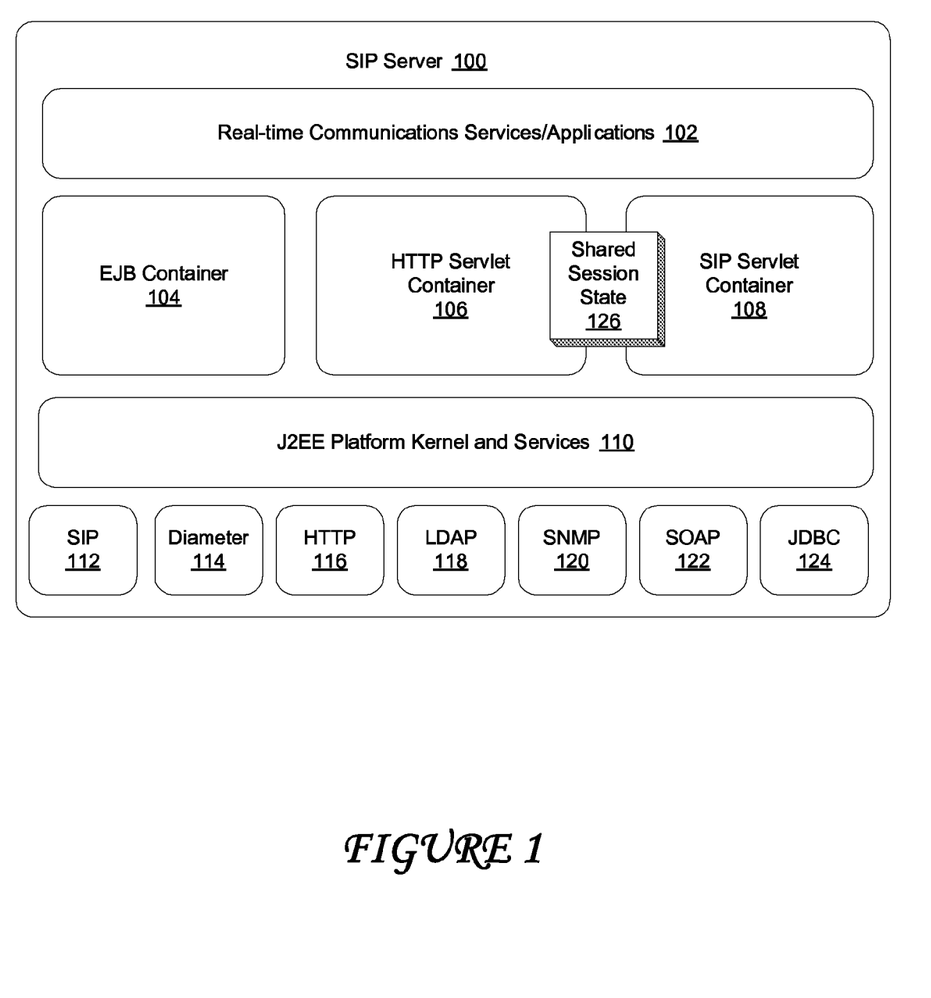
FIG. 1 is an exemplary illustration of various components of the SIP Server, in accordance with various embodiments.

FIG. 1 is an exemplary illustration of various components of the SIP Server, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In the embodiment illustrated, the SIP Server 100 is a carrier-class Java Enterprise Edition (J2EE) application server that has been extended with support for the Session Initiation Protocol (SIP) and other operational enhancements that allow it to meet the demanding requirements of next-generation internet protocol (IP) based communications networks. The SIP Server can be used to create, deploy and manage various real-time communications services and applications 102 by telecom operators who wish to provide mobile and fixed multimedia services. As with any Java application server, the SIP server can take advantage of the J2EE Platform Kernel and Services 110 in order to compile, execute and optimize the performance of various programs and applications. In one embodiment, the SIP server 100 is also extended with support for a multitude of standards and protocols such as SIP 112, Diameter 114, Hyper Text Transfer Protocol (HTTP) 116, Lightweight Directory Access Protocol (LDAP) 118, Simple Network Management Protocol (SNMP) 120, Simple Object Access Protocol (SOAP) 122, Java Database Connectivity (JDBC) 124, and others.

As stated previously, the SIP Server 100 is enabled to support session initiation protocol (SIP). SIP is a protocol used primarily for creating and terminating sessions with one or more participants, such as setting up or tearing down voice or video calls. SIP is described in more detail in RFC 3261 of the IETF SIP Working Group, which is incorporated herein by reference.

The SIP protocol specification defines different types of high level SIP roles, namely user agents (UA) which include UA clients, UA servers, and Back-to-Back user agents (B2BUA). The SIP protocol also defines the roles of Proxies, Registrars and Redirect Servers. Accordingly, the SIP Servlet API of the SIP server 100 allows any of these roles to be coded as a SIP Servlet Application. Furthermore, because SIP is an extensible protocol, the API is also designed to allow developers to easily extend functionality. This can be accomplished by dividing up the SIP processing between the container functions and the applications. Most of the base protocol can be performed by the container, leaving the higher level tasks for the applications to perform. This division of processing can lead to a great amount of flexibility to the SIP Servlet API.

As further illustrated in FIG. 1, the SIP Server 100 can include an Enterprise Java Bean (EJB) container 104, an HTTP Servlet container 106 and a SIP Servlet container 108. Each of these containers can provide an environment that supports the execution of applications developed using its corresponding technology. For example, the EJB container 104 manages enterprise beans contained within it, which in turn provide the business logic for a J2EE application. This management can encompass services such as registering, creating and destroying objects and their instances, providing remote interfaces to objects, managing the state of objects, maintaining security, and coordinating distributed transactions. Similarly, the HTTP container 106 and the SIP Servlet container 108 can be responsible for managing HTTP and SIP servlets respectively.

The SIP stack of the SIP Server 100 can be fully integrated into the SIP Servlet container 108 and is more powerful and easier to use than a traditional protocol stack. For example the higher level abstraction of the SIP Servlet API can free the developer from the mechanics of handling of transaction timers, syntactic evaluation of received requests, generation of non application-related responses, generation of fully formed SIP requests from request objects (which may involve correct preparation of system headers and generation of syntactically correct SIP messages) and handling of lower-layer transport protocols such as Transport Control Protocol (TCP), User Datagram Protocol (UDP) and Stream Control Transmission Protocol (SCTP).

In one embodiment, the Servlet container can provide a Shared Session Context 126 and session application programming interface (API) in order to maintain awareness of the state of the larger converged SIP and HTTP application session. There are many use cases where a converged application, using both SIP and HTTP functions, is desirable. Some examples of these applications include conferencing and click-to-call applications, as well as Presence and User Agent Configuration Management applications. The converged applications can also use other protocols (e.g. Diameter) to perform more advanced functions such as modifying subscriber profile data. Furthermore, the container can provider a whole host of other services including distributing request and response objects to components in a structured way as well as managing the end-to-end object lifecycle, including resource, transaction and session state management.

Figure 2:
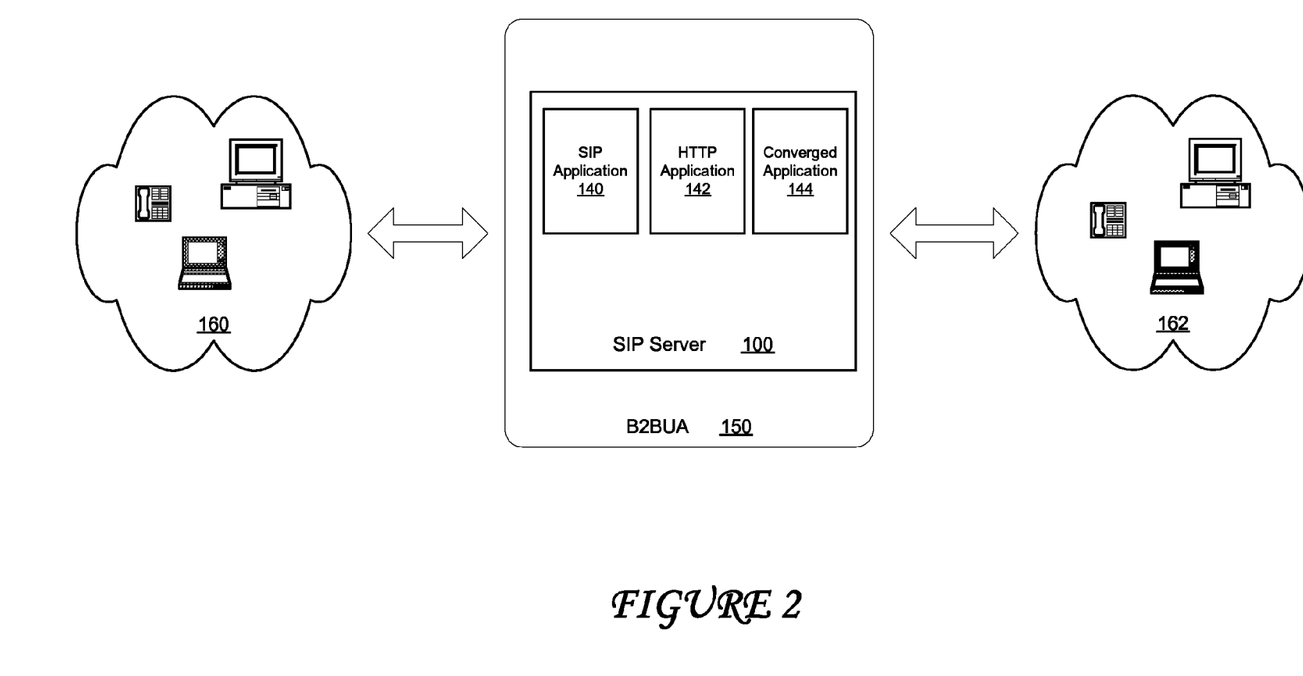
FIG. 2 is an illustration of an exemplary use of the SIP Server, in accordance with various embodiments.

FIG. 2 is an illustration of an exemplary use of the SIP Server, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In the embodiment illustrated, the SIP server 100, along with the various applications hosted thereon (e.g. 140, 142 and 144), can be used as a back-to-back user agent (B2BUA) 150 in a typical telecommunications environment. A B2BUA can take the place of an intermediary between communications by user agents 160, 162, which may include various cellular phones, wireless devices, laptops, computers, applications, and other components capable of communicating with one another electronically. The B2BUA 150 can provide multiple advantages, such as controlling the flow of communication between user agents, enabling different types of user agents to communicate with one another (e.g. a web application can communicate with a cellular phone), as well as various security advantages. As one illustration, the user agents can transmit to the SIP server instead of communicating directly to each other and thus malicious users can be prevented from sending spam and viruses, hacking into other user agent devices, and otherwise compromising security. It should be noted that the SIP Server 100 need not necessarily take the role of a B2BUA as illustrated in FIG. 2, but can also be used as a proxy, a redirect server, or some other role defined by the SIP protocol.

Figure 3:
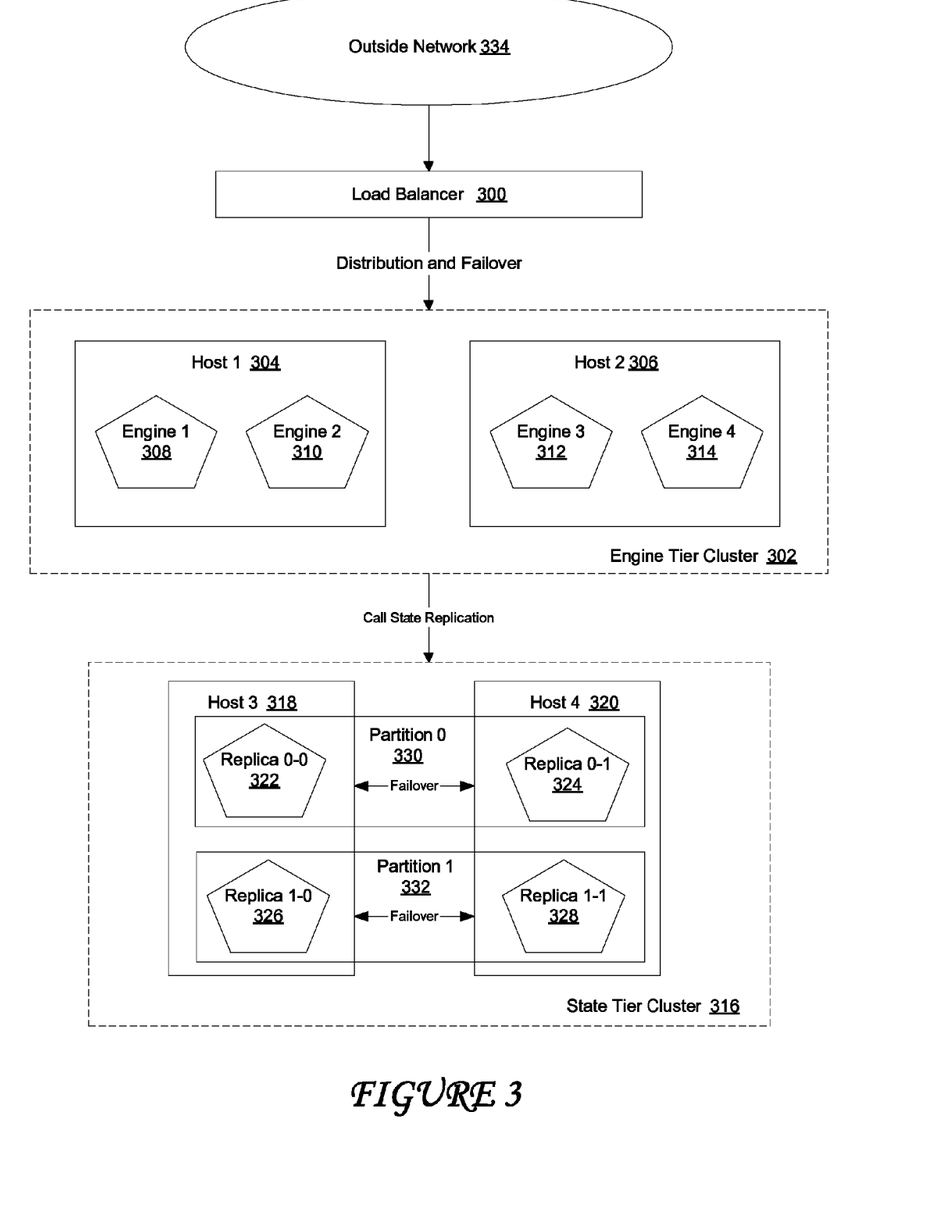
FIG. 3 is an exemplary illustration of a tiered architecture of the SIP server deployment, in accordance with various embodiments.

FIG. 3 is an exemplary illustration of a tiered architecture of the SIP server deployment, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, various messages, such as phone call requests or other transfers of data associated with the SIP protocol, can come into the cluster from the internet (such as over VoIP), phone, or some other type of outside network 334. This message can be received and handled by a load balancer 300 which can be responsible distributing message traffic across the engines (i.e. engine 1 308, engine 2 310, engine 3 312 and engine 4 314) in the cluster which handle the processing of the message traffic. The load balancer can be a standard load balancing appliance hardware device and it is not necessary that it be SIP aware; there is no requirement that the load balancer support affinity between the engines and SIP dialogs or transactions. Alternatively, the load balancer can be implemented as software that distributes the messages to the various engines. In the various embodiments, the primary goal of the load balancer 300 can be to provide a single public address that distributes incoming SIP requests to available servers in the SIP server engine tier cluster 302. Such distribution of requests can ensure that the SIP server engines are fully utilized. The load balancer 300 can also be used for performing maintenance activities such as upgrading individual servers or applications without disrupting existing SIP clients.

In the embodiment illustrated, the SIP server can provide a two-tier cluster architecture model to handle the incoming messages. In this model, a stateless engine tier cluster 302 can process all signaling traffic and can also replicate transaction and session state to the state tier cluster 316 which in turn can be divided into multiple partitions. Each partition can consist of any number of nodes (replicas) distributed across any number of hosts such as host 3 318 and host 4 320 which can be implemented as computers linked in a cluster type network environment. For example, partition 0 330 can include state replica 0-0 322 and a state replica 0-1 324 which can maintain copies of the call state information of the partition. The state tier cluster 316 can be an n-way peer-replicated Random Access Memory (RAM) store that maintains various data objects which can be accessed by the engine nodes in the engine tier. In this manner, engines can be provided a dual advantage of faster access to the data objects than retrieving data from a database while at the same time, engines can be freed up from having to store the data onto the engine tier itself. This type of separation can offer various performance improvements. The state tier can also function as a lock manager where call state access follows a simple library book model, (i.e. a call state can be checked out by one SIP engine at a time).

On the other hand, the engine tier cluster 302 can be implemented as a cluster of SIP server instances that hosts the SIP servlets which provide various features to SIP clients. In one embodiment, the engine tier is stateless, meaning that the SIP session state information is not persisted in the engine tier, but is obtained by querying the state tier cluster 316 which can in turn provide replication and failover services for SIP session data.

In various embodiments, the Java Virtual Machine (JVM) garbage collection algorithms can slow down the throughput processing and cause latency when removing stateful long-lived objects from memory. These stateful objects can be thought of as being more global (e.g. referenced by various threads and entities) than other localized stateless objects and as such, the garbage collector would typically stop all thread execution in order to clean them up. In some cases, this can introduce latency since the execution of various threads needs to be halted for a period of time while the garbage collector removes the unused stateful objects. While in typical web server environments this processing pause may be tolerated, the SIP server environment is generally highly sensitive to any latency and as such, this form of garbage collection pausing can be undesirable.

As such, the call state, which may include such stateful objects, can be maintained in memory on the state tier of the SIP server deployment. The engine tier, on the other hand, can be generally stateless so as not to become significantly affected by the various JVM garbage collection and heap clearing processes. Thus, the primary goal of the engine tier 302 can be to provide maximum throughput combined with low response time to SIP clients. As the number of calls or their duration increases, more server instances can be added to the engine tier to manage the additional load. It should be noted however, that although the engine tier may include many such server instances, it can be managed as a single, logical entity. For example, the SIP servlets can be deployed uniformly to all server instances by targeting the cluster itself and the load balancer need not maintain affinity between SIP clients and individual servers in the engine tier.

In various embodiments, the state tier cluster 316 can be implemented as a cluster of SIP server instances that provides a high-performance, highly-available, in-memory store for maintaining and retrieving session state data for SIP servlets. This session data may be required by SIP applications in the SIP server engine tier 302 in order to process incoming messages. Within the state tier 316, session data can be managed in one or more partitions (e.g. partition 0 330 and partition 1 332), where each partition manages a fixed portion of the concurrent call state. For example, in a system that uses two partitions, the first partition 0 330 could manage one half of the concurrent call state (e.g. A-M) and the second partition 1 332 can manage the other half (e.g. N-Z). With three partitions (not shown), each can manage a third of the call state and so on. Additional partitions can be added as needed to manage large number of concurrent calls or incoming messages.

In one embodiment, within each partition, multiple state servers can be added to provide redundancy and failover should the other servers in the partition fail. When multiple servers participate in the same partition, those servers can be referred to as replicas because each server maintains a duplicate copy of the partition's call state. For example, partition 0 330 can maintain its state information in replica 0-0 322 and replica 0-1 324. In some embodiments, the replicas can be distributed over multiple hosts (e.g. host 3 318 and host 4 320) in order to provide host-to-host failover services in cases where a computer crashes. Furthermore, to increase the capacity of the state tier 316, the data can be split evenly across a set of partitions, as previously discussed. The number of replicas in the partition can be called the replication factor, since it determines the level of redundancy and strength of failover that it provides. For example, if one node goes down or becomes disconnected from the network, any available replica can automatically provide call state data to the engine tier.

Replicas can join and leave the associated partition and each replica can serve as exactly one partition at a time. Thus, in one embodiment, the total available call state storage capacity of the cluster is a summation of the capacities of each partition.

In one embodiment, each partition can peer-replicated, meaning that clients perform all operations (reads/writes) to all replicas in the partition (wherein the current set of replicas in the partition is called the partition view). This can provide improved latency advantages over more traditional synchronous "primary-secondary" architecture wherein one store acts as a primary and the other nodes serve as secondaries. Latency is reduced because there is no wait for the second hop of primary-secondary systems. The peer-replicated scheme can provide better host-to-host failover characteristics as well, since there does not need to be change propagation delay.

In one embodiment, the engine nodes 308, 310, 312 and 314 which are distributed over multiple hosts 304, 306, can be responsible for executing the call processing. Each call can have a call state associated with it. This call state can contain various information associated with the call, such as the ids of the caller/callee, where the caller is, what application is running on the callee, as well as any timer objects that may need to fire in order to process the call flow. The state for each call can be contained in the state tier 316. The engine tier 302, on the other hand, could be stateless in order to achieve the maximum performance. In alternative embodiments, the engine tier can have small amounts of state data stored thereon at selected periods of time.

In one embodiment, a typical message processing flow can involve locking/getting the call state, processing the message and putting/unlocking the call state. The operations supported by the replicas for normal operations can include:
 lock and get call state
 put and unlock call state
 lock and get call states with expired timers As previously discussed, the state tier 316 can maintain call state in various data objects residing in the random access memory (RAM) of a computer. This can provide significant access speed advantages to the engine tier 302. The SIP server can also provide a way for efficiently persisting long-lived state information to a database (disk storage) in order to avoid unnecessary consumption of cluster resources. Since RAM is generally significantly more expensive than database memory, it may be desirable to reduce the number of replicas in the state tier 316 by storing at least some of the session state information to the database. In many cases, database access to data is slower than RAM-based replica access. However, because some SIP communications are not as latency-sensitive as others, these communications can be persisted in the database in order to save the amount of random access memory required by the SIP server deployment. For example, a standard telephone call can be viewed as having three stages—a call setup stage, an active call stage and the call teardown stage (hanging up the call). The call setup stage is typically the most latency-sensitive since users tend to expect immediate results from the server after pressing the call button. However, the call teardown stage may not be as sensitive to latency because after the handset disconnects, it may not matter from the user's perspective how long it will take for the server to complete call termination. As such, session state for call termination can be maintained in a database. Similarly, the active call stage may also be not as latency-sensitive as the call setup stage since it mostly involves communication of voice bits between media servers. It should be noted that this example of a telephone call is provided purely for purposes of illustration and is not intended to limit the invention.

Diameter Rf Interface Application for Offline Charging

In various embodiments, the SIP server provides a Java-based Diameter Offline Charging Application that can be used by applications deployed on the engine nodes to generate charging events based on the Rf interface of Diameter protocol. Offline charging is used for network services that are paid for periodically. For example, users may have a subscription for voice calls that is paid monthly. Thus, every time that a user makes a phone call, there can be a record made that registers the occurrence of, length and other data associated with that phone call. This record usually involves a series of requests and responses exchanged between several servers such as the charging trigger function (CTF) and the charging data function (CDF).

The Rf protocol specifies how an IP multimedia subsystem (IMS) charging trigger function (CTF) issues offline charging events to a charging data function (CDF). The Diameter protocol is described in further detail in RFC 3588 "Diameter Base Protocol" available from the Network Working Group, which is incorporated in its entirety herein by reference. The Rf protocol is more fully described in TS 32.299 available from the 3$^{rd}$ Generation Partnership Project (3GPP), which is also incorporated herein by reference.

The charging events issued by the CTF can either be one-time events or alternatively may be session-based. The Diameter Offline Charging Application allows any application deployed on the SIP server to generate charging events based on the Rf protocol. In various embodiments, the Diameter Offline Charging Application is Java-based in order to take advantage of interoperability between the various servers and other IMS network elements. An offline charging application programming interface (API) is provided in order to enable any deployed application to act as a CTF and issue offline charging events. Furthermore, the session state for the offline charging application can be maintained in the state tier replicas of the SIP server deployment in order to take advantage of the high throughput processing by the engine tier.

In one embodiment, the reporting of offline charging events to the CDF is done through the Diameter Accounting Request (ACR) message. The event types supported by the offline charging application include START, INTERIM, STOP and EVENT types. The START, INTERIM and STOP types are used for session-based accounting. The EVENT type, on the other hand, is used for event-based accounting, or to report unsuccessful session establishment attempts. Furthermore, the service-information attribute-value pair (AVP) of the ACR request can be used to send the application-specific charging service information from the SIP server to the CDF charging server. In one embodiment, this is a grouped AVP whose value depends on the application and its charging function. The offline charging API allows the application to set this information on the request before it is sent out.

In various embodiments, the CDF can respond to the SIP server's ACR messages with an Accounting Answer (ACA) message. The ACA can also be of the START, INTERIM, STOP and EVENT types, similarly to the ACR messages. The flow of messages between the SIP server and the CDF will be illustrated and discussed in further detail below.

Figure 4:
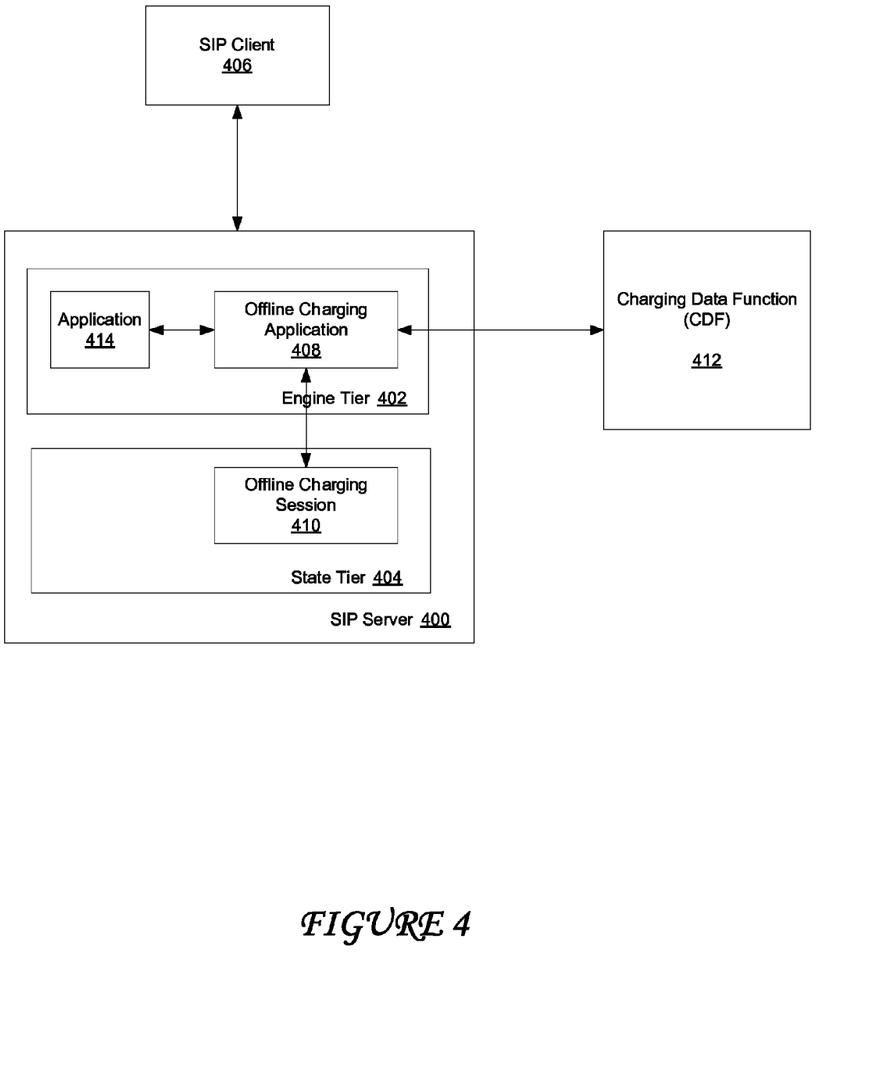
FIG. 4 is an exemplary illustration of the SIP server offline charging support, in accordance with various embodiments.

FIG. 4 is an exemplary illustration of the SIP server offline charging support, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the SIP server 400 can include an engine tier 402 used for high throughput processing of SIP communications and a state tier 404 for storing various call state information. An offline charging application 408 deployed in the engine tier can be used by the various SIP server applications 414 in order to generate and send charging events to the charging data function (CDF) server 412. Each instance of the offline charging session 410, on the other hand, can be used to actually hold the per-session state unique to each call. In this manner, the applications running on the engine tier 402 can access the necessary state information in the offline charging session 410 by querying the state tier replicas 404. Since the accounting session state for offline charging is serializable, it can be stored as a SIP application session attribute. In one embodiment, because the client APIs are synchronous, it is not necessary for the Diameter engine to maintain any state for the accounting session once the servlet has finished handling the call.

In various embodiments, the charging event is a Diameter accounting request (ACR) message that includes the following event types:

| | |
|---|---|
| START | Start an accounting session |
| INTERIM | Update an accounting session |
| STOP | Stop an accounting session |
| EVENT | One time accounting event |

In one embodiment, the event types START, INTERIM and STOP are used for session based accounting, while the EVENT type is used for event based accounting or to report unsuccessful session establishment attempts.

The SIP server can also be adapted to deal with connection failures and unresponsive CDFs. For example, in the event that a configured primary CDF has failed, the offline charging application can be configured to send the accounting information to a configured secondary. Since the CDF is typically essentially stateless, even session based charging events can be re-transmitted to the secondary CDF. In the event that the CDF is available but no reply is received by the SIP server within a configured timeout, the ACA can be re-transmitted to the same CDF up to a maximum number of repetitions. If no reply is still received after the configured number of retransmits, then the connection failure procedure is initiated to a second CDF.

In various embodiments, the following classes can be added to the SIP server to enable offline charging:

| | |
|---|---|
| ACR | Accounting request message |
| ACA | Accounting answer message |
| ClientSession | Client based accounting session |
| RecordType | Accounting record type constants |

In addition the following classes can be added in order to support the Rf application specifically:

| | |
|---|---|
| RfApplication | Offline charging application |
| RfSession | Offline charging session |

In various embodiments, the offline charging application can also be used to directly modify the ACR request before it is sent out. This can be done in order for an application to add any custom attribute value pairs (AVPs) to the request. For example, the application can set the service information AVP that carries the service-specific parameters for the CDF. This is a grouped AVP whose value depends on the application and its charging function. In this manner, the application can use the offline charging application to specify service-specific data for ACR messages.

In one embodiment, the accounting interim interval timer value can be used to indicate the expiration time of an Rf accounting session (offline charging session). It is specified when an ACR START is sent to the CDF to initiate the accounting session. The CDF can respond with its own timer value which is used by the SIP server to start a timer object upon whose expiration an ACR INTERIM message should be sent. The INTERIM message informs the CDF that the session is still in use, otherwise the CDF is configured to terminate the session.

It can be the application's responsibility to send ACR INTERIM messages since they will be used to send updated service information data to the CDF. This can be done by creating a servlet timer set to expire according to the accounting interim interval value. When the timer expires, the application should send an ACR INTERIM message with the updated service information data.

For session-based accounting, the RfApplication class (offline charging application) can be used to create new accounting sessions for generating session-based charging events. In one embodiment, each accounting session is represented by an instance of RfSession (offline charging session) which encapsulates the accounting state machine for the session.

In one embodiment, when an RfApplication is deployed, it is immediately made available to each application deployed on the SIP server through a context parameter such as "com.bea.wcp.diameter.charging.RfApplication." This context parameter can then be accessed in a servlet's init method using a method similar to one illustrated below. It should be noted that the any code shown herein is provided purely for purposes of illustration and is in no way intended to limit the invention.

```
private RfApplication rfApp;
void init (ServletConfig conf) {
    ServletContext ctx = conf.getServletContext( );
    rfApp = (RfApplication)
    ctx.getParameter("com.bea.wcp.diameter.RfApplication");
}
```

An instance of the offline charging application can be used to issue offline charging requests concurrently in multiple threads. The offline charging session, on the other hand, actually holds the session state data for each SIP call. For session based charging requests, the application can use the offline charging application to create an instance of the offline charging session and then use the session object to create one or more charging requests. For example, the first request is a ACR START request, optionally followed by ACR INTERIM requests and ending with the ACR STOP request. Upon receiving a corresponding ACA STOP message, the offline charging application can then terminate the offline charging session.

A nonlimiting example of starting and stopping a session-based accounting session is illustrated below:

```
//start a new session
RfSession session = rfApp.createSession( );
ACR acr = session.createRequest(RecordType.START);
acr.setUserName(dac@bea.com);
AvpList si = new AvpList( );
si.addAvp(Charging.SERVICE_INFORMATION, si);
acr.send( );
ACA aca = acr.waitForAnswer(1000);
if(aca==null) { //send error}
//stop the accounting session
ACR acr = session.createRequest(RecordType.STOP);
acr.send( );
ACA aca = acr.waitForAnswer(1000);
if(aca==null) {//send error}
```

In one embodiment, event based charging requests are automatically terminated upon receipt of a corresponding EVENT ACA message. A nonlimiting example of using the offline charging session for sending an event-based charging request is illustrated below.

```
RfSession session = rfApp.createSession( );
ACR acr = session.createRequest(RecordType.EVENT);
    acr.setUserName("dac@bea.com");
    acr.addAvp(Charging.SERVICE_INFORMATION, ...);
    acr.send( );
```

Alternatively, it is also possible to send event-based charging requests using the offline charging application directly. Since internally, the RfApplication creates an instance of RfSession associated with the ACR request, it is equivalent to creating the session explicitly. A nonlimiting example is illustrated below:

```
ACR acr = rfApp.createEventRequest( );
    acr.setUserName("dac");
    acr.addAvp(Charging.SERVICE_INFORMATION, ...);
    acr.send( );
```

In one embodiment, the sending of ACR messages is synchronous such that the application is waiting until the ACA response is received from the CDF. In alternative embodiments, however, an asynchronous solution may be implemented in order to reduce latency.

In one embodiment, for both session-based and event-based accounting, the instance of the offline charging application class is adapted to automatically handle the creation of session identifiers, as well as updating the accounting-record-number AVP which is used to sequence messages within the same accounting session.

Figure 5:
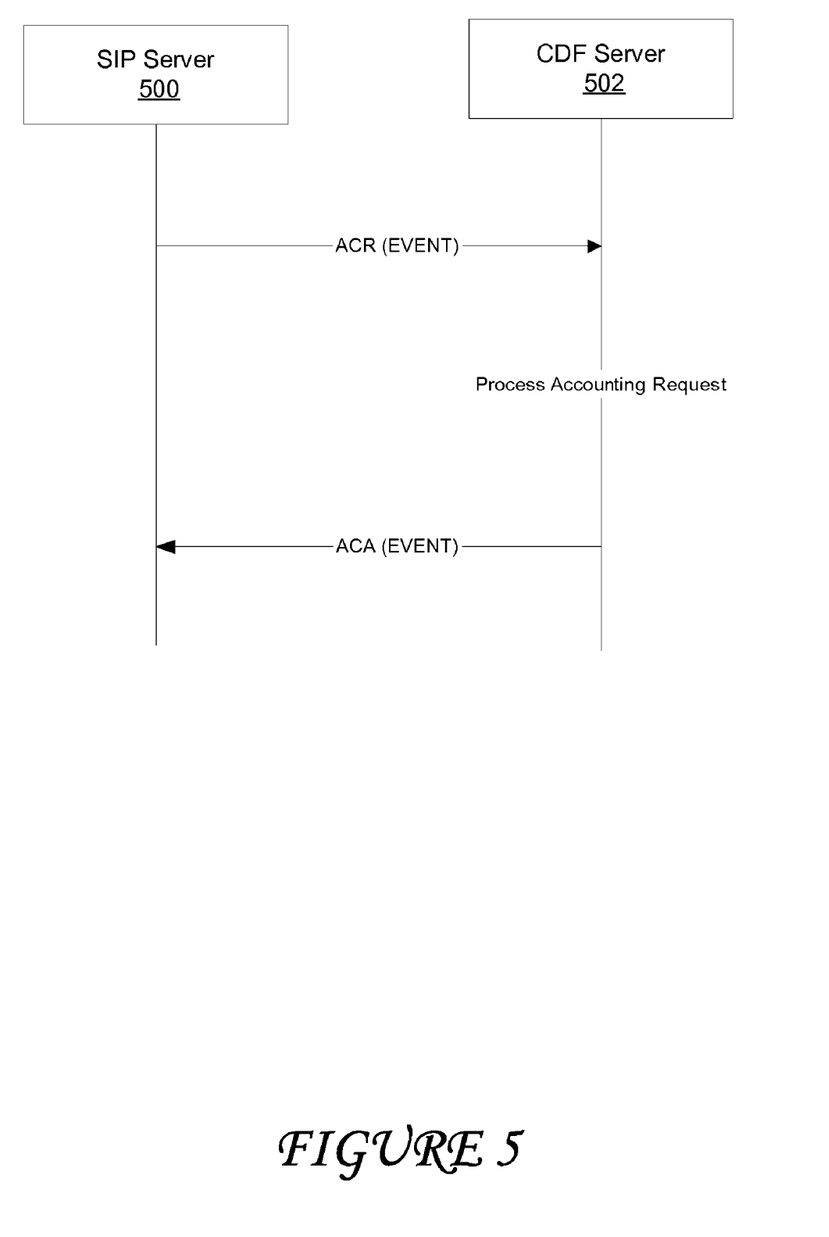
FIG. 5 is an exemplary illustration of the event-based message flow for a SIP server with offline charging, in accordance with various embodiments.

FIG. 5 is an exemplary illustration of the event-based message flow for a SIP server with offline charging, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

In this figure time can be viewed as flowing downward in a vertical fashion. As shown, the SIP server 500, acting as the CTF, can begin by sending an ACR message of type EVENT. The CDF 502 can receive this message and upon receipt, the CDF processes the accounting request. Once it has finished processing, the CDF can respond by transmitting the ACA message of type EVENT. Since this is event based accounting, the charging requests can then be automatically terminated by the SIP server upon receipt of a corresponding EVENT ACA message.

Figure 6:
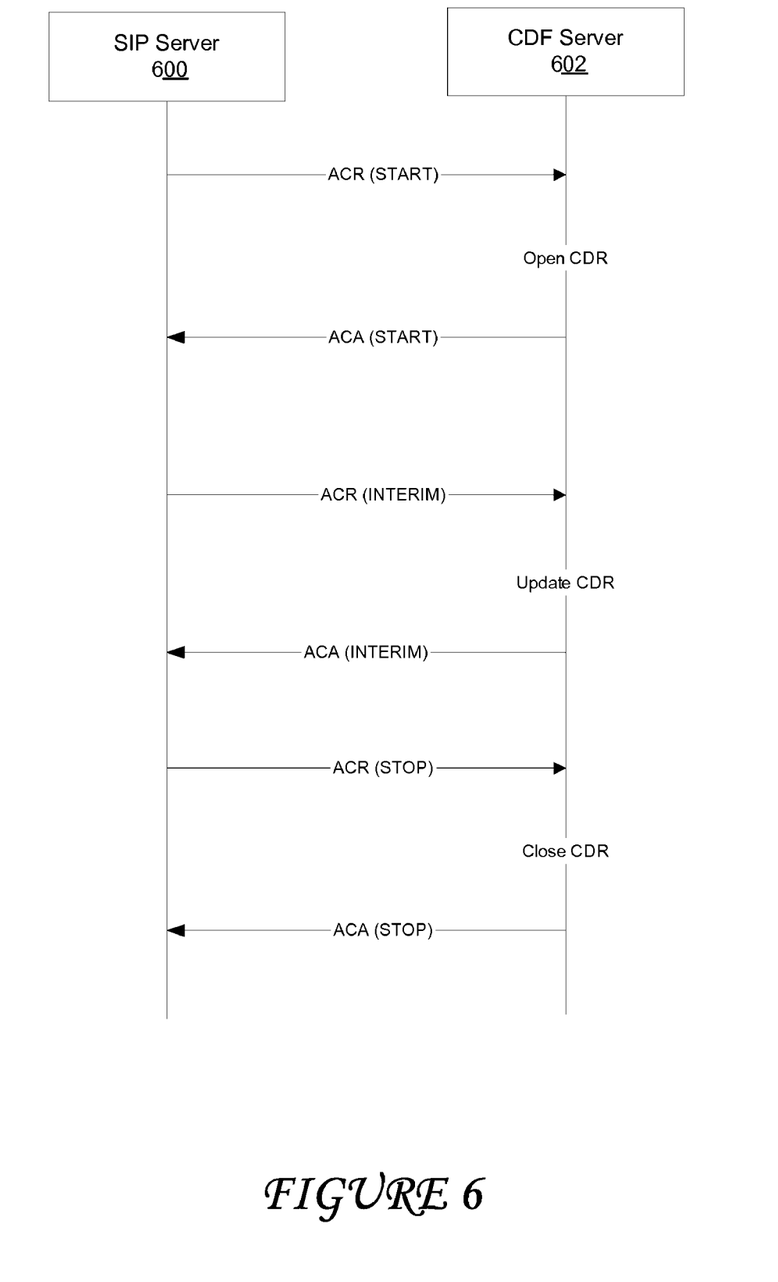
FIG. 6 is an exemplary illustration of the session-based message flow for a SIP server with offline charging, in accordance with various embodiments.

FIG. 6 is an exemplary illustration of the session-based message flow for a SIP server with offline charging, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated, the flow can begin by the SIP server 600 transmitting an ACR START message to the CDF 602. Upon receiving this message, the CDF server 602 can open the charging data record (CDR) for the accounting session and respond by transmitting an ACA START back to the SIP server 600. This can be followed by an arbitrary number of ACR INTERIM requests by the SIP server, each request followed by an ACA INTERIM response from the CDR. During these interim communications, the CDR can be updating the CDR so as to reflect changes in the accounting session. Finally, when finishing the accounting session, the SIP server can send the ACR STOP request, and upon receiving an ACA STOP response from the CDF, the SIP server can close the accounting session.

Figure 7:
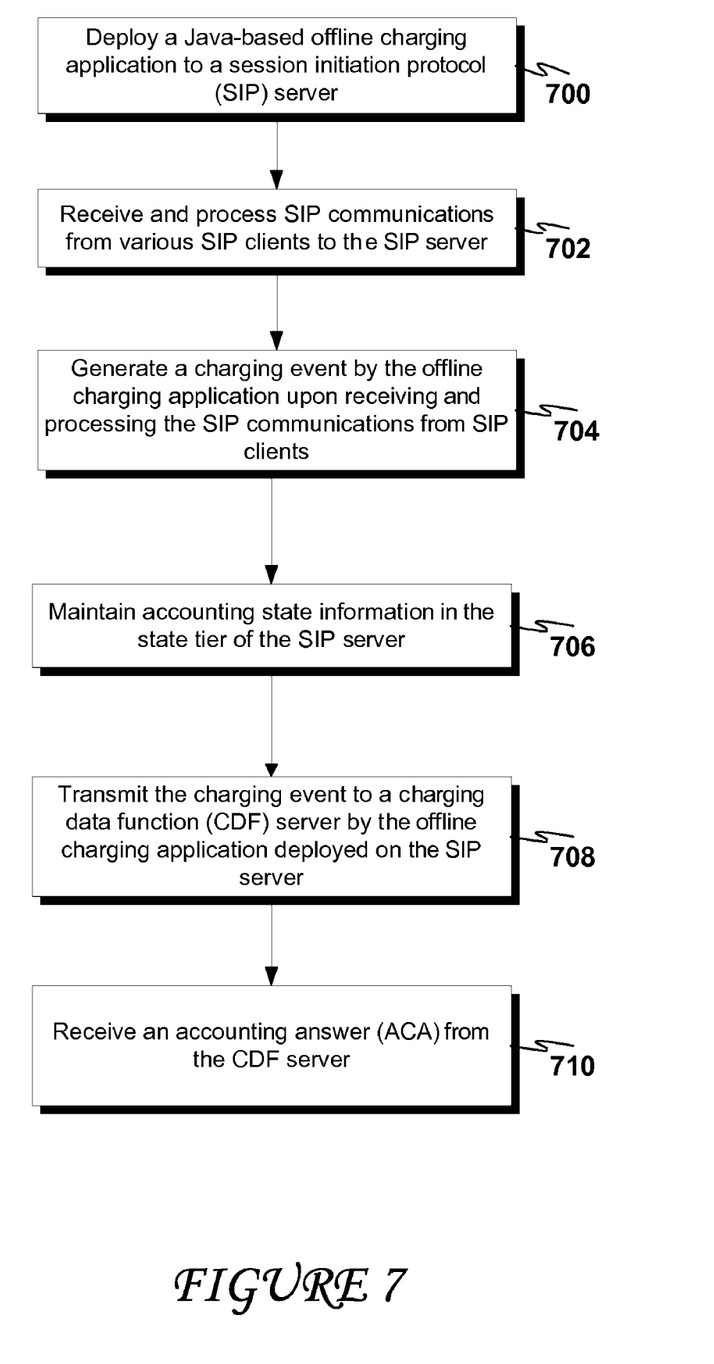
FIG. 7 is an exemplary flow chart diagram of SIP server with offline charging, in accordance with various embodiments.

FIG. 7 is an exemplary flow chart diagram of SIP server with offline charging, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 700, a Java based offline charging application can be deployed to the SIP server. Other applications can also be deployed which are adapted to process SIP communications from various SIP clients, as shown in step 702. In one embodiment, upon receiving certain communications, the offline charging application can be called upon to generate a charging event, as illustrated in step 704. The accounting session state for this charging event can be maintained in the state tier of the SIP server, as shown in 706. The charging event can then be transmitted by the SIP server to the CDF, as illustrated in step 708. For example, in order to begin the accounting session, an ACR message of type START can be transmitted, while closing the accounting session may involve sending the ACR message of type STOP. As shown in step 710, the CDF server can respond to the ACR request by sending an ACA message, such as an ACA START or ACA STOP message, as previously discussed.

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments and containers, as well as user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing offline charging and processing of a plurality of Session Initiation Protocol (SIP) communication sessions in a telecommunications network, said system comprising:
   a network layer in the telecommunications network comprising a stateless tier and a stateful tier;
   a charging data function (CDF) server in the telecommunications network external to the network layer;
   said stateless tier of the network layer comprising a plurality of stateless server nodes;
   said stateful tier of the network layer comprising an n-way peer-replicated Random Access Memory (RAM) store accessible from the stateless tier;
   a plurality of SIP server application instances operating on said plurality of stateless server nodes in the stateless tier of the network layer, wherein the plurality of SIP server application instances process SIP communications for said plurality of SIP communication sessions;
   an offline charging application operating on one of said plurality of stateless server nodes in the stateless tier of the network layer, wherein the offline charging application communicates with the plurality of SIP server application instances;
   wherein for each SIP communication session of said plurality of SIP communication sessions,
      one of said plurality of SIP server application instances receives and processes SIP communications for said SIP communication session and stores a call state for said SIP communication session in said n-way peer-replicated RAM store of said stateful tier;
      one of said plurality of SIP server application instances communicates a charging request for said SIP communication session to the offline charging application,
      the offline charging application transmits an accounting request for said SIP communication session to the charging data function (CDF) server, and receives an accounting answer from the CDF server including a timer value,
      the offline charging application creates an accounting session state object for said SIP communication session in the call state for said SIP communication session stored in said n-way peer-replicated RAM store of said stateful tier and a timer object based on the timer value received from the CDF server; and
      upon expiration of the timer object, if the SIP communication session has not ended, the offline charging application transmits an interim accounting request to the CDF server.

2. The system of claim 1, wherein the offline charging application communicates with the CDF server using Diameter protocol.

3. The system of claim 1, wherein the offline charging application comprises an offline charging application programming interface (API) configured to allow the SIP server application instances to issue offline charging events via the offline charging application.

4. The system of claim 1, wherein said offline charging application is configured to transmit accounting requests to the CDF server including at least the following request types:
   a start type configured to begin an accounting session;
   an interim type configured to update said accounting session; and
   a stop type configured to terminate said accounting session.

5. The system of claim 1, wherein the offline charging application is configured to issue accounting requests concurrently in multiple threads.

6. The system of claim 1, wherein said plurality of SIP server application instances running on the stateless tier are configured to query the accounting session state objects created by the offline charging application in said n-way peer-replicated RAM store of said stateful tier.

7. The system of claim 1, wherein the stateful tier functions as a lock manager wherein the call state stored in said n-way peer-replicated RAM store of said stateful tier for each SIP communication session can be checked out by only one SIP server application instance in the stateless tier at a time.

8. The system of claim 1, wherein additional SIP server application instances are created to manage received SIP communications greater than a predetermined number of SIP communications.

9. The system of claim 1, wherein the offline charging application is Java based.

10. The system of claim 1, wherein communication between the offline charging application and the CDF server is synchronous such that the offline charging application waits until receiving the accounting answer from the CDF server.

11. A method for providing offline charging and processing of a plurality of Session Initiation Protocol (SIP) communication sessions in a telecommunications network, said method comprising:
providing a network layer in the telecommunications network comprising a stateless tier and a stateful tier;
providing a charging data function (CDF) server in the telecommunications network external to the network layer;
said stateless tier of the network layer comprising a plurality of stateless server nodes;
said stateful tier of the network layer comprising an n-way peer-replicated Random Access Memory (RAM) store accessible from the stateless tier;
providing a plurality of SIP server application instances operating on said plurality of stateless server nodes in the stateless tier of the network layer, wherein the plurality of SIP server application instances process SIP communications for said plurality of SIP communication sessions;
providing an offline charging application operating on one of said plurality of stateless server nodes in the stateless tier of the network layer, wherein the offline charging application communicates with the plurality of SIP server application instances; and
for each SIP communication session of said plurality of SIP communication sessions,
receiving and processing SIP communications for said SIP communication session with one of said plurality of SIP server application instances and storing a call state for said SIP communication session in said n-way peer-replicated RAM store of said stateful tier;
communicating a charging request for said SIP communication session from one of said plurality of SIP server application instances to the offline charging application;
transmitting an accounting request for said SIP communication session from said offline charging application to the charging data function (CDF) server;
receiving an accounting answer including a timer value at said offline charging application from the CDF server,
creating, using said offline charging application, an accounting session state object for said SIP communication session in the call state for said SIP communication session stored in said n-way peer-replicated RAM store of said stateful tier and a timer object based on the timer value received from the CDF server; and
transmitting an interim accounting request from said offline charging application to the CDF server upon expiration of the timer object, if the SIP communication session has not ended.

12. The method of claim 11, wherein the offline charging application communicates with the CDF server using Diameter protocol.

13. The method of claim 11, further comprising:
providing an offline charging application programming interface (API) for said offline charging application wherein the SIP server application instances issue offline charging events via the offline charging application using said API.

14. The method of claim 11, wherein said offline charging application is configured to transmit accounting requests to the CDF server including at least the following request types:
a start type configured to begin an accounting session;
an interim type configured to update said accounting session; and
a stop type configured to terminate said accounting session.

15. The method of claim 11, wherein the offline charging application is configured to issue accounting requests concurrently in multiple threads.

16. The method of claim 11, further comprising:
querying the accounting session state objects created by the offline charging application in said n-way peer-replicated RAM store of said stateful tier from SIP server application instances running on the stateless tier.

17. The method of claim 11, wherein the stateful tier functions as a lock manager wherein the call state for each SIP communication session stored in said n-way peer-replicated RAM store of said stateful tier can be checked out by only one SIP application server instance in the stateless tier at a time.

18. The method of claim 11, wherein additional SIP server application instances are created to manage received SIP communications greater than a predetermined number of SIP communications.

19. The method of claim 11, wherein communication between the offline charging application and the CDF server is synchronous such that the offline charging application waits until receiving the accounting answer from the CDF server.

20. A non-transitory computer-readable storage medium having instructions stored thereon for providing offline charging and processing of a plurality of Session Initiation Protocol (SIP) communication sessions in a telecommunications network, which instructions, when executed by one or more processors, cause the one or more processors to perform steps comprising:
providing a network layer comprising a stateless tier and a stateful tier;
providing a charging data function (CDF) server external to the network layer;
said stateless tier of the network layer comprising a plurality of stateless server nodes;
said stateful tier of the network layer comprising an n-way peer-replicated Random Access Memory (RAM) store accessible from the stateless tier;

providing a plurality of SIP server application instances operating on said plurality of stateless server nodes in the stateless tier of the network layer, wherein the plurality of SIP server application instances process SIP communications for said plurality of SIP communication sessions;

providing an offline charging application operating on one of said plurality of stateless server nodes in the stateless tier of the network layer, wherein the offline charging application communicates with the plurality of SIP server application instances; and for each SIP communication session of said plurality of SIP communication sessions,     receiving and processing SIP communications for said SIP communication session with one of said plurality of SIP server application instances and storing a call state for said SIP communication session in said n-way peer-replicated RAM store of said stateful tier;

communicating a charging request for said SIP communication session from one of said plurality of SIP server application instances to the offline charging application;

transmitting an accounting request for said SIP communication session from said offline charging application to the charging data function (CDF) server;

receiving an accounting answer including a timer value at said offline charging application from the CDF server,     creating, using said offline charging application, an accounting session state object for said SIP communication session in the call state for said SIP communication session stored in said n-way peer-replicated RAM store of said stateful tier and a timer object based on the timer value received from the CDF server; and     transmitting an interim accounting request from said offline charging application to the CDF server upon expiration of the timer object, if the SIP communication session has not ended.

* * * * *